Oct. 1, 1935.  J. MAZZOCO  2,016,114
SAUERKRAUT MACHINE
Filed June 11, 1934
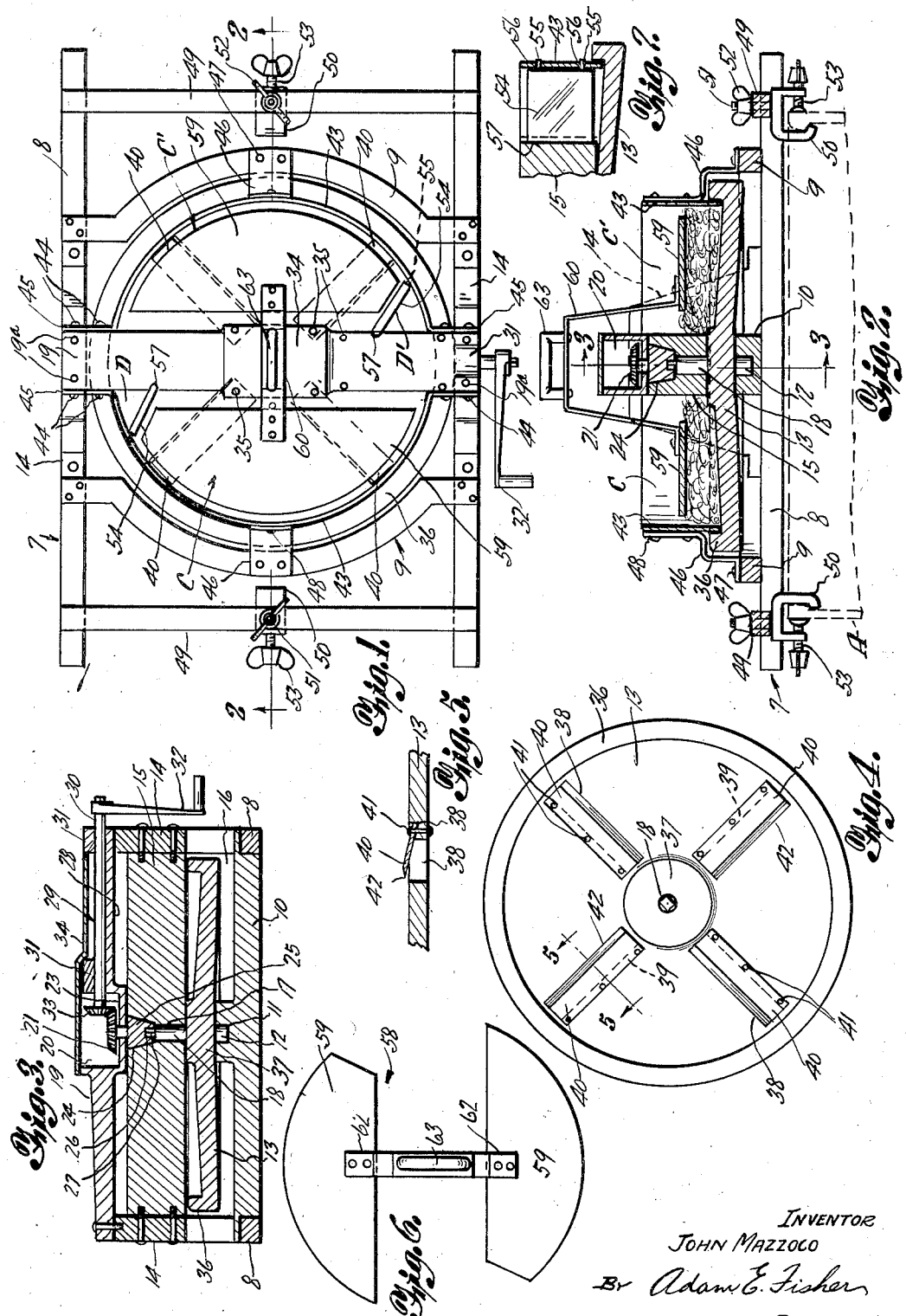
INVENTOR
JOHN MAZZOCO
By Adam E. Fisher
ATTORNEY Patented Oct. 1, 1935

2,016,114

UNITED STATES PATENT OFFICE 2,016,114

SAUERKRAUT MACHINE

John Mazzoco, Trinidad, Colo.

Application June 11, 1934, Serial No. 730,043

1 Claim. (Cl. 146—125)

My invention relates to sauerkraut machines or machines for slicing or cutting vegetables and the main object is to provide a machine of this kind in a simple, practical and convenient form which may be readily placed over a tub or other vessel and the vegetables sliced or cut rapidly and easily by simply placing them in the machine and turning a crank thereon.

Another object is to provide a machine of this kind comprising a frame adapted to be secured over the rim of the receiving vessel by conveniently placed and operated clamps and having a crank rotated cutting disk with radially extended cutting knives to which the vegetables may be held and pressed by a removable pad member or plates, the disk being enclosed within a substantially circular upstanding wall or rim divided centrally by a beam or cross bar of the frame so as to provide two separate but identical hopper or cutting chambers at each side.

With these and other objects in view as may appear hereinafter in the course of this specification attention is directed to the accompanying drawing wherein a preferred embodiment of my invention is shown for purposes of exemplification and wherein:

Figure 1 is a plan view of my machine.

Figure 2 is a section along the line 2—2 in Figure 1, showing the machine in use and as mounted on the rim of a receptacle shown in dotted lines.

Figure 3 is a section along the line 3—3 in Figure 2.

Figure 4 is a detached plan view of the cutting disk alone.

Figure 5 is an enlarged section along the line 5—5 in Figure 4.

Figure 6 is a detached plan view of the pressure pad element alone.

Figure 7 is a detail view in cross section through one wall and cross beam showing the mounting of one of the stop plates.

Referring now with more particularity to the drawing my invention comprises a frame designated generally at 7 and made up of the side rails 8 joined by spaced arcuate cross bars 9 and a medial cross beam 10. The latter has a central bearing socket 11 receiving a stub or pin 12 on the underside and center of a circular cutter disk 13 which turns in this socket within the confines of the frame 7. Side brackets 14 are secured centrally on each side rail 8 and between these brackets an upper cross beam 15 is extended in parallelism with the lower beam 10 and spaced upwardly therefrom to provide a passage way 16 for the disk 13, this upper beam 15 having a central aperture or bore 17 receiving the shaft 18 extended upwardly from the said disk. An upper gear housing or bridge member 19 is secured by bolts 19a across the upper ends of the side brackets 14 in line with the upper cross beam 15 and has a central enlarged section cut out to provide a gear chamber or case 20 in which is journaled a beveled gear 21. The shaft 22 of this gear 21 is journaled down through the bottom 23 of the gear chamber 20 and has a tapered drive collar 24 which is journaled in the complementarily tapered upper end or mouth 25 of the bore 17 in the upper cross beam 15. The collar 22 has a square or angular socket 26 in its lower end receiving the squared upper end 27 of the disk shaft 18 whereby the disk 13 may be rotated by rotation of the gear 21. One laterally extended arm 28 of the bridge member 19 is provided with a longitudinal shaft channel 29 in which a drive shaft 30 is journaled, by means of conventional bearing caps 31 at the inner and outer ends of the channel, the outer end of the said drive shaft being provided with a crank 32 out at one side of the machine and the inner end of the shaft within the gear chamber 20 being provided with a beveled pinion 33 placed in mesh with the aforesaid gear 21. The gear chamber 20 and channel 29 are covered with a shield plate 34 secured in place by screws 35.

The cutter disk 13 has an upstanding marginal rim 36 and between the central hub portion 37 and this rim the disk preferably slopes downwardly and outwardly as shown in Figures 2 and 3. A plurality (here shown as four) of radially extended slots 38 are cut through the disk between the hub and rim and one upper margin of each slot is recessed out angularly or shouldered as at 39 to receive a cutting blade 40 which is secured to said shoulder by bolts or screws 41 and by the angularity of the shoulder is supported over the slot with its cutting edge 42 extended angularly upward slightly above the plane of the upper face of the disk and spaced from the opposite margin of the slot as best shown in Figure 5. One blade 40 is of course provided for each slot 38 as described and their cutting edges 42 are all directed forwardly in the direction in which the cutting disk will be rotated when the crank 32 is turned and the gear and pinion 21 and 33 set in motion.

Arcuate walls or sides 43 are secured by screws 44 through their out-turned ends 45 to the ends of the upper cross beam 15 at each side thereof and are of such shape and size that they will fit nicely at their lower margins within the marginal rim 36 of the cutter disk and permit free rotation of said disk while at the same time effectually enclosing the disk. Braces or brace straps 46 are secured at 47 to medial points on the aforesaid arcuate cross bars 9 and extend upwardly and inwardly therefrom over the disk rim 36 and are secured to the outer sides of the walls 43 at 48 whereby to brace and reinforce said walls at their centers.

The machine so constructed may be secured over the top of a tub, barrel or other receptacle to receive the products and one such vessel is indicated in dotted lines A in Figure 2, the fastening being by means of clamp bars 49 set over the side rails 8 and having at their centers inverted U-shaped clamps 50 adapted to be set astraddle the rim of the vessel. These clamps 50 are held in place on the bars 49 by bolts 51 and wing nuts 52 and are secured to the vessel A by clamp screws 53 of conventional form. The clamp bar 49 may be placed at any position along the outer ends of the side rails 8 to fit the vessel but it is of course necessary that the vessel be of such size that the side rails 8 may rest on its upper end in order that the machine may be pressed down tight on the vessel when the clamps are tightened. When so mounted vegetables of any kind but especially cabbage and the like designated at B in Figure 2 may be placed in the two identical chambers designated at C and C' and upon rotation of the disk 13 as described these vegetables will be cut or sliced by the blades 40 and will drop through the slots 38 into the vessel A beneath. In order to prevent the vegetables from "piling up" in the corners D and D' of the chambers C and C' toward which the blades 40 move as the cutting disk rotates stop plates 54 are placed between the walls 43 and upper cross beam 15 at some distance from these corners and in substantially parallel positions relative to the knives 40 as they pass beneath. These stop plates 54 in height extend from near the top of the walls 43 to the upper face of the cutter disk and are secured in place by studs 55 on their outer sides which project into apertures 56 in said walls and by entering their inner sides in vertical grooves or sockets 57 in the sides of the cross beam 15. The vegetables striking these plates will be held while cut by the blades 40 instead of wedging up and working out of the sharp corners D and D'.

In order to press the vegetables to the disk 13 for proper cutting action I provide a pressure member or tamper designated generally at 58 made up of two segmental plates or pads 59 of shape and size to nicely enter the chambers C and C' and joined by an inverted U-shaped strap 60 adapted to straddle the cross beam 15 and bridge member 19. This strap 60 is secured by screws 61 through its feet 62 to the pads 59 and has a handle 63 on its bight by which it may be placed on the machine and the pads pressed down on the vegetables therein as needed for best cutting action. Opposite ends of the pads 59 are cut off angularly at 64 to clear the stop plates 54. By removing the bolts 19a the bridge member 19 may be readily removed allowing access to the disk drive for cleaning or lubrication this action being facilitated by the drive collar 24 and its slip or socket connection to the shaft 18. The machine may be further taken apart by removing only a few screws as will be aparent.

It is thought the operation of the machine will be readily understood without further description herein, it being evident that almost any kind of vegetables may be readily and rapidly sliced or cut as needed making the machine particularly useful in making sauer kraut and the like.

While I have herein set forth a certain preferred embodiment of my invention, it is understood that I may vary from the same in minor structural details, so as best to construct a practical device for the purpose intended, not departing from the spirit of the invention and within the scope of the appended claim.

I claim:

In a machine of the kind described, a frame comprising side rails, a lower cross beam, a disk journaled on the cross beam, an upper cross beam mounted across and above the disk, a bridge member mounted above the upper cross beam and having a central gear chamber, a pair of meshing gears mounted in the chamber and one connected to the disk, a crank mounted exteriorly of the frame and connected to the other gear, the said disk having an upstanding marginal rim, arcuate side walls secured at their ends to the upper cross beam and fitting within the said disk rim, and radially extended cutting blades on the disk, the said disk having radial slots adjacent and beneath the cutting blades and stop plates extended between the side walls and upper cross beam adjacent opposite ends thereof, the said stop plates being set substantially in parallelism with the blades on the disk, clamp bars set across the side rails of the frames, clamps mounted centrally on the clamp bars, a tamping member comprising pressure plates adapted to enter the chamber between the side walls and upper cross beam, and an inverted U-shaped connecting strap between the plates adapted to straddle and clear the said cross beam and bridge member of the frame.

JOHN MAZZOCO.